UNITED STATES PATENT OFFICE.

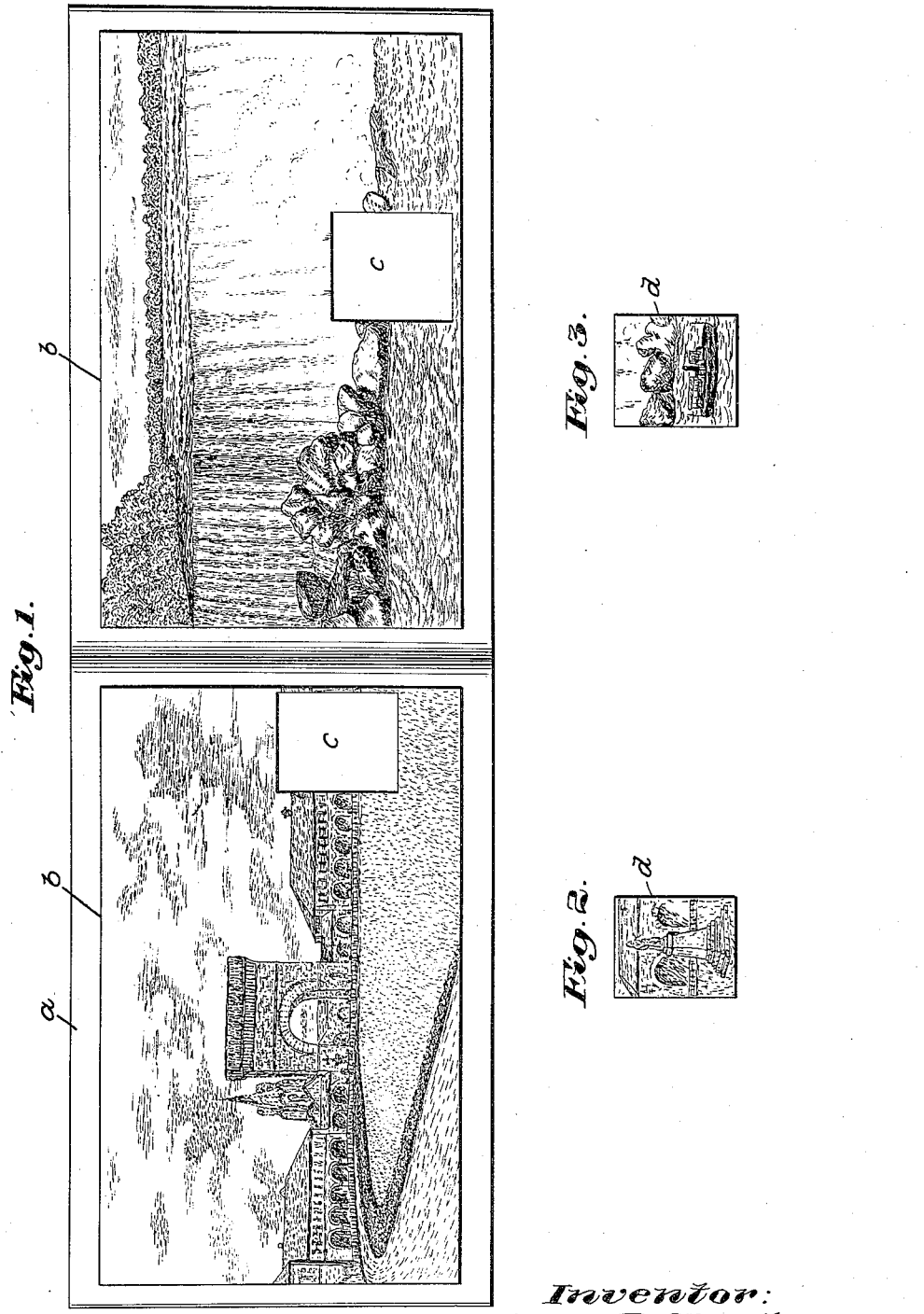

JESSE R. CLARK, OF CHICAGO, ILLINOIS, ASSIGNOR TO THE FORBES LITHOGRAPH MFG. CO., OF BOSTON, MASSACHUSETTS, A CORPORATION OF MASSACHUSETTS.

EDUCATIONAL DEVICE.

1,139,256.      Specification of Letters Patent.      Patented May 11, 1915.

Application filed April 4, 1914. Serial No. 829,447.

*To all whom it may concern:*

Be it known that I, JESSE R. CLARK, a citizen of the United States, and a resident of Chicago, Illinois, have invented an Improvement in Educational Devices, of which the following description, in connection with the accompanying drawings, is a specification, like characters on the drawings representing like parts.

This invention relates to educational devices, and among other objects aims to stimulate interest in a subject and so closely direct the attention thereto as to forcibly impress and fix the subject in the mind.

The character of the invention may be best understood by reference to the following description of an illustrative embodiment thereof shown in the accompanying drawing, wherein:

Figure 1 is a plan view of an illustrative educational device embodying the invention; and Figs. 2 and 3 are details to be referred to.

Referring to the drawing, $a$ designates a sheet typified herein as a part of a book containing incomplete pictures $b$, $b$, in which features, such for example as important features thereof, are lacking. Spaces $c$, $c$ for the missing portions of the pictures are left blank and are adapted to be filled in by stickers $d$, $d$, each of a size to fit in the blank space of the picture and having on one side the missing portion of the picture and on the other side an adhesive coating. After the stickers are pasted in the blank spaces the pictures are complete. Preferably the device comprises a series of sheets each provided with an incomplete picture or pictures, the missing portions of which are to be supplied by stickers such as described. This series may relate to one subject, such for example as historical points of interest in various cities, or if desired the series may relate to different subjects. As shown herein the picture on the left of the sheet is "The Leland Stanford, Jr. University" and the lacking feature is a statue supplied by the sticker; while the picture on the right of the sheet is "Niagara Falls" and the lacking feature is "The Maid of the Mist" supplied by the sticker. A child may be supplied with a book containing such pictures and also with an assembly of the stickers, said pictures and stickers being marked if desired to enable the child to identify the different stickers with the pictures to which they belong.

The physical act of selecting the sticker and applying and fitting it to the blank of the picture closely concentrates the mind of the child on the subject thereof so as forcibly to impress the same upon his mind. An advantage in providing a series of these incomplete pictures resides in the incentive to fill the stickers in the blanks of all of the pictures and thereby complete the series. Thus his mind is directed and concentrated to and carried along through the entire series. Preferably the sticker contains an important feature of the picture which forms a complete entity in itself. By thus placing such a portion of the picture on the sticker the child's attention is focused advantageously thereon. In pasting the sticker in its blank in its appropriate position his mind is naturally directed to the features in the picture associated with or surrounding the sticker. Thus his attention also is desirably directed thereto. A title or descriptive paragraph may be printed beneath the picture.

The device is not only useful from its educational point of view, but also it may be used advantageously as an advertising medium. For example, in merchandizing a commodity each package thereof may be supplied with a sticker containing the missing portion of a picture. After six packages have been purchased and six stickers collected, the purchaser may be given a book containing fifty pictures with blanks such as described so that he may paste the stickers in their appropriate blanks. He continues to purchase the packages and paste stickers in blanks until the entire series is complete. As a reward and incentive for the completing of the book the purchaser may be given a nicely bound new book containing a series of complete unpatched pictures of the same subjects as those contained in the book in which the customer has applied the stickers.

In selecting the packages for sale at random there of course would be likelihood that a single purchaser would obtain duplicate stickers. This would stimulate exchanging or trading of the stickers and thus the sale of the commodity would spread and increase.

It will be understood that it is not essential that the series of sheets containing the pictures be in book form since they might be on separate sheets or cards if desired.

Having described one illustrative embodiment of the invention without limiting the same thereto, what I claim as new and desire to secure by Letters Patent is:

An educational device comprising a series of main, incomplete pictures, each having an interruption therein leaving a blank space, the series of blank spaces being of similar contour, and a series of complete picture elements of similar contour, each of said elements formed to fit one of said spaces, and containing matter identifying the same with one of the main pictures, and supplying the missing part of such main picture, and an adhesive coating on each of said incomplete picture elements for securing the same permanently in its proper space.

In testimony whereof, I have signed my name to this specification, in the presence of two subscribing witnesses.

JESSE R. CLARK.

Witnesses:
C. O. SHEPHERD,
A. R. WAGNER.

Copies of this patent may be obtained for five cents each, by addressing the "Commissioner of Patents, Washington, D. C."